United States Patent
Niu et al.

(10) Patent No.: US 12,341,310 B2
(45) Date of Patent: Jun. 24, 2025

(54) AUTOMATIC INSERTION AND REMOVAL DEVICE FOR CONNECTOR, AUTOMATIC INSERTION METHOD, AUTOMATIC REMOVAL METHOD, AND COMPUTER-READABLE STORAGE MEDIUM

(71) Applicant: ZTE Corporation, Shenzhen (CN)

(72) Inventors: Kun Niu, Shenzhen (CN); Zuolin Gao, Shenzhen (CN); Hongjun Zhu, Shenzhen (CN); Xiaogang Du, Shenzhen (CN); Chao Chen, Shenzhen (CN); Weiping Yi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 458 days.

(21) Appl. No.: 17/779,259

(22) PCT Filed: Nov. 2, 2020

(86) PCT No.: PCT/CN2020/125939
§ 371 (c)(1),
(2) Date: May 24, 2022

(87) PCT Pub. No.: WO2021/114954
PCT Pub. Date: Jun. 17, 2021

(65) Prior Publication Data
US 2022/0407278 A1    Dec. 22, 2022

(30) Foreign Application Priority Data
Dec. 12, 2019  (CN) .......................... 201911274481.4

(51) Int. Cl.
*H01R 43/26* (2006.01)
*G02B 6/38* (2006.01)

(52) U.S. Cl.
CPC ........... *H01R 43/26* (2013.01); *G02B 6/3898* (2013.01); *Y10T 29/53209* (2015.01)

(58) Field of Classification Search
CPC ..... H01R 43/26; B25J 19/02; Y10T 29/53209
(Continued)

(56) References Cited

U.S. PATENT DOCUMENTS 8,186,216 B2 *  5/2012  Ogawa ................... H01R 43/26
                                                          73/488
9,847,009 B2 * 12/2017  Walker ................... G01N 29/00
(Continued)

FOREIGN PATENT DOCUMENTS

CN          105594073 A          5/2016
CN          106442144 A          2/2017
(Continued)

OTHER PUBLICATIONS

European Patent Office. Extended European Search Report for EP Application No. 20899250.3, mailed Nov. 28, 2022, pp. 1-7.
(Continued)

*Primary Examiner* — Thiem D Phan
(74) *Attorney, Agent, or Firm* — Vivacqua Crane, PLLC (57) ABSTRACT

An automatic plugging/unplugging device for a connector, an automatic plugging method, an automatic unplugging method, and a computer-readable storage medium are disclosed. The automatic plugging/unplugging device may include a clamping unit (201) and a force detection unit (202). The clamping unit (201) is configured to hold a connector (10), and may include at least one of a vibration sensor (2017) and a sound sensor (2014). The vibration sensor (2017) is configured to detect the vibration resulting from plugging or unplugging the connector (10), and the sound sensor (2014) is configured to detect the sound generated during plugging or unplugging the connector (10).

(Continued)

The force detection unit (202) may include a detection base (2021) and a force sensor (2023). The force sensor (2023) is configured to detect the magnitude of a plugging or unplugging force generated during plugging or unplugging the connector (10).

14 Claims, 5 Drawing Sheets

(58) Field of Classification Search
USPC .................................. 29/747, 593, 729, 825
See application file for complete search history.

(56) References Cited

U.S. PATENT DOCUMENTS

| | | |
|---|---|---|
| 2010/0178806 A1 | 7/2010 | Montena |
| 2014/0203945 A1 | 7/2014 | Benner et al. |
| 2015/0098574 A1 | 4/2015 | Fry et al. |
| 2018/0356281 A1 | 12/2018 | Casari et al. |

FOREIGN PATENT DOCUMENTS

| | | | |
|---|---|---|---|
| CN | 206248258 U | | 6/2017 |
| CN | 207215332 | * | 4/2018 |
| CN | 207215332 U | | 4/2018 |
| CN | 108140990 A | | 6/2018 |
| WO | 2008142490 A1 | | 11/2008 |

OTHER PUBLICATIONS

International Searching Authority. International Search Report and Written Opinion for PCT Application No. PCT/CN2020/125939 and English translation, mailed Feb. 3, 2021, pp. 1-11.

* cited by examiner

AUTOMATIC INSERTION AND REMOVAL DEVICE FOR CONNECTOR, AUTOMATIC INSERTION METHOD, AUTOMATIC REMOVAL METHOD, AND COMPUTER-READABLE STORAGE MEDIUM

CROSS-REFERENCE TO RELATED APPLICATION

This application is a national stage filing under 35 U.S.C. § 371 of international application number PCT/CN2020/125939, filed Nov. 2, 2020, which claims priority to Chinese patent application No. 201911274481.4 filed Dec. 12, 2019. The contents of these applications are incorporated herein by reference in their entirety.

TECHNICAL FIELD

Embodiments of the present disclosure relate to the field of communication equipment and automation, in particular to an automatic plugging/unplugging device for a connector, an automatic plugging method, an automatic unplugging method, and a computer-readable storage medium.

BACKGROUND

Standard connectors are widely used in industrial equipment because of providing convenient and reliable signal docking modes. Realizing the intelligent docking and plugging/unplugging of connectors is not only a premise of realizing automation and intelligence of equipment, but also a key technology of realizing automatic detection, automatic calibration, automatic connection and automatic exchange of industrial equipment.

Standard optical fiber connectors and electrical connectors are mostly used in manual plugging/unplugging or quick connection scenarios. Connectors and sockets have positioning and alignment functions in structures, and both have locking functions as well. In the existing automatic docking and plugging/unplugging technology, automatic alignment between a connector and an adapter is realized mainly by positioning, guiding and adapting devices in structural or mechanical design, and the automatic plugging/unplugging operation is realized by the motion control of a motion device such as a motor or a cylinder. In the plugging/unplugging and docking process, the plugging/unplugging depth and distance of the connector are preset, and when the motion device controls the connector to be plugged or unplugged to a preset position, it is considered that plugging or unplugging is successful.

In the actual engineering application, due to the factors such as machining tolerances and assembling errors between connectors and adapters, it is impossible to ensure that all connectors may be plugged in place when docking is achieved according to the preset position or depth. Moreover, an over-large plugging force may cause a connector or an adapter in a product to be damaged, while an over-small plugging force may cause poor signal contact, resulting in failing to achieve an expected performance index.

SUMMARY

According to embodiments in a first aspect of the present disclosure, provided is an automatic plugging/unplugging device for a connector, including: a clamping unit and a force detection unit. The clamping unit is configured to hold a connector and may include at least one of a vibration sensor and a sound sensor. The vibration sensor is configured to detect the vibration resulting from plugging or unplugging the connector. The sound sensor is configured to detect the sound generated during plugging or unplugging the connector. The force detection unit may include a detection base and a force sensor. The force sensor may include a locking end and a movable end. The locking end is connected to the detection base, and the movable end is connected to the clamping unit. The force sensor is configured to detect the magnitude of a plugging or unplugging force generated during plugging or unplugging the connector.

According to embodiments in a second aspect of the present disclosure, provided is an automatic plugging method for the automatic plugging/unplugging device for a connector. The automatic plugging method may include following steps: driving the automatic plugging/unplugging device for a connector to move close to a socket or an adapter by an external driving device; and judging whether the connector is plugged in place according to a detection result from one of the force sensor, the sound sensor and the vibration sensor.

According to embodiments in a third aspect of the present disclosure, provided is an automatic unplugging method for the automatic plugging/unplugging device for a connector. The automatic unplugging method may include following steps: judging whether a latch on the connector needs to be unlocked, if so, unlocking the latch; otherwise, executing the next step; driving the automatic plugging/unplugging device for a connector to move away from a socket or an adapter by an external driving device; and judging whether the connector is unplugged successfully according to a detection result from one of the force sensor, the sound sensor and the vibration sensor.

According to embodiments in a fourth aspect of the present disclosure, provided is a computer-readable storage medium storing a computer program, where the computer program is configured to carry out the automatic plugging method or automatic unplugging method for any one automatic plugging/unplugging device for a connector mentioned above.

Additional aspects and advantages of the present disclosure will be set forth in part from the following description, and in part will be apparent from the following description, or may be learned by practice of the present disclosure.

REFERENCE NUMERALS

10. Connector;
20. Automatic plugging/unplugging device for connector;
201. Clamping unit: 2011. Clamping base; 2012. Clamping cover plate; 2013. Guide rod; 2014. Sound sensor; 2015. Fit groove; 2016. Limiting step; 2017. Vibration sensor; 2018. Flexible rubber pad; 2019. Clamping locking component;
202. Force detection unit; 2021. Detection base; 2022. Locking end; 2023. Force sensor; 2024. Movable end;
203. Automatic unlocking unit; 2031. Actuator; 2032. Slider; 2033. Pulley; 2034. Unlocking spring leaf;
204. Housing;
30. Adapter plate; 40. Industrial mechanical arm; 50. Tray; 60. Electric sliding table; 70. To-be-docked component.

DETAILED DESCRIPTION

In order to make the technical problems solved by the present disclosure, the adopted technical schemes and the achieved technical effects clearer, the technical schemes of the present disclosure will be further explained below with reference to the drawings and specific embodiments.

It is to be understood in the description of the present disclosure that the instructed orientation or positional relationships of terms such as "central", "longitudinal", "transverse", "length", "width", "thickness", "upper", "lower", "front", "back", "left", "right", "vertical", "horizontal", "top", "bottom", "inner", "outer", "clockwise", "counterclockwise", "axial", "radial" and "circumferential" are based on the orientation or positional relationships shown in the drawings, merely for ease of description of the present disclosure and the simplification for the description, rather than indicating or implying that the device or element referred to must have a specific orientation or be constructed and operated in a specific orientation, which, therefore, shall not be construed as limiting the present disclosure.

In addition, features limited by "first" and "second" can explicitly or impliedly include one or more features, which are used to distinguish the described features, regardless of order or importance. In the description of the present disclosure, the meaning of "a plurality of" is two or more unless otherwise specified.

It should be noted in the description of the present disclosure that, unless otherwise specifically regulated and defined, terms such as "installation", "connected", and "connecting" shall be understood in broad sense, which, for example, may refer to fixed connection or detachable connection or integral connection, may refer to mechanical connection or electrical connection, and may refer to direct connection or indirect connection through an intermediate medium or internal communication of two elements. For those having ordinary skill in the art, the specific meanings of the above terms in the present disclosure may be understood according to concrete conditions.

According to embodiments in a first aspect of the present disclosure, provided is an automatic plugging/unplugging device for a connector. The structure of the automatic plugging/unplugging device 20 for a connector will be described below with reference to FIGS. 1-4.

As shown in FIGS. 1-4, in the embodiments of the present disclosure, an automatic plugging/unplugging device 20 for a connector includes a clamping unit 201 and a force detection unit 202. The clamping unit 201 is configured to hold a connector 10, and includes at least one of a vibration sensor 2017 and a sound sensor 2014. The vibration sensor 2017 is configured to detect the vibration resulting from plugging or unplugging the connector 10, and the sound sensor 2014 is configured to detect the sound generated during plugging or unplugging the connector 10. The force detection unit 202 includes a detection base 2021 and a force sensor 2023. The force sensor 2023 includes a locking end 2022 and a movable end 2024. The locking end 2022 is connected to the detection base 2021, and the movable end 2024 is connected to the clamping unit 201. The force sensor 2023 is configured to detect the magnitude of a plugging or unplugging force generated during plugging or unplugging the connector 10.

It is to be understood that the plugging process of the automatic plugging/unplugging device 20 for a connector of the embodiments of the present disclosure may be divided into following stages:

Approaching stage: after the connector 10 is placed on the clamping unit 201, the automatic plugging/unplugging device 20 is driven to move close to a socket or an adapter by an external driving mechanism. In the absence of contact between the connector 10 and the socket or adapter, none of the force sensor 2023, the sound sensor 2014 and the vibration sensor 2017 can detect any data.

Plugging stage: when the connector 10 is partially plugged into the adapter or socket, the clamping unit 201 may move close to the force detection unit 202 due to the extrusion of the adapter or socket, and the detected value of the force sensor 2023 may change. Therefore, the force sensor 2023 may detect the magnitude of the plugging force from the connector 10, and according to the data detected by the force sensor 2023, an operator can accurately monitor the magnitude of the plugging force from the connector 10, thus avoiding the phenomenon that the connection is unstable due to an over-small plugging force from the connector 10 or the phenomenon that the connector 10, adapter or socket is damaged due to an over-large plugging force from the connector 10. In addition, in actual operation, the plugging force from the connector 10 may be controlled not to exceed a value K1 to ensure that the connector 10, the adapter or the socket is not damaged. The value K1 may be set with reference to connector standards and practical application requirements.

Plugging-in-place judgment stage: due to the existence of the force detection unit and at least one of the sound sensor 2014 and the vibration sensor 2017 in the embodiment of the present disclosure, in the process of judging whether the connector 10 is plugged in place, one or more of the following methods may be used to realize accurate judgment.

First, judgment method based on plugging force: in the plugging process, if the plugging force gradually increases, the value of the plugging force detected by the force sensor 2023 may increase. When the detected value of the force sensor 2023 reaches a limit value K2, it is judged that the connector 10 is plugged in place. The value K2 may be set with reference to connector standards and practical application requirements.

Second, judgment method based on sound: in the plugging process, the sound of action of a circlip when the connector 10 is successfully docked with the adapter or socket is detected by the sound sensor 2014, and if it is detected that the sound intensity exceeds a preset intensity for several times, it is judged that docking is successful. For example, for a push-pull locking connector 10, that is, an SC optical fiber connector or an MU optical fiber connector, a snap on the connector 10 may be actuated twice during plugging of such connector 10. Therefore, when a loud sound is detected twice during the sound detection, it may be considered that the connector 10 is plugged in place. For another example, for an RJ latch connector 10 (a connector with an RJ45 latch), an LC optical fiber connector (an LUCENT connector) or the like, the snap needs to be actuated once during plugging of such connector 10. Therefore, when a loud sound is detected once during the sound detection, it may be considered that the connector 10 is plugged in place.

Third, judgment method based on vibration: in the plugging process, the vibration of the connector 10 caused by the action of the circlip when docking is successful is detected by the vibration sensor 2017, and if it is detected that the vibration intensity exceeds a preset vibration intensity for several times, it is judged that docking is successful. For example, for a push-pull locking connector 10, that is, an SC optical fiber connector or an MU optical fiber connector, a snap on the connector 10 may be actuated twice during plugging of such connector 10. Therefore, when the vibration sensor detects that the connector 10 is subjected to large vibration twice, it may be considered that the connector 10 is plugged in place. For another example, for an RJ latch connector 10 (a connector with an RJ45 latch), an LC optical fiber connector (an LUCENT connector) or the like, the snap needs to be actuated once during plugging of such connector 10. Therefore, when, by the vibration sensor, it is detected that the connector 10 is subjected to a large vibration once, it may be considered that the connector 10 is plugged in place.

Similarly, during unplugging of the connector 10, one or more of the unplugging force judgment, vibration judgment and sound judgment may be used to judge whether the connector 10 is unplugged successfully, specifically:

First, detection judgment method based on unplugging force: in the unplugging process, if the unplugging force drops and approaches zero, it is indicated that the connector 10 is unplugged successfully.

Second, detection judgment method based on sound: in the unplugging process, the sound of releasing of the snap during unplugging is detected by the sound sensor 2014, and if it is detected that the sound intensity exceeds a preset intensity for several times, it is judged that the connector 10 is unplugged.

Third, detection judgment method based on vibration: in the unplugging process, the vibration of the connector 10 caused by the releasing of the snap during unplugging is detected by the vibration sensor 2017, and if it is detected that vibration intensity exceeds a preset intensity for several times, it is judged that unplugging is successful.

Therefore, by means of the automatic plugging/unplugging device 20 for a connector of the embodiments of the present disclosure, during automatic plugging of the connector 10, whether the connector 10 is plugged in place or unplugged successfully is judged by means of one or more of the plugging force or unplugging force judgment, vibration judgment and sound judgment, the plugging process is accurately controlled, and docking consistency, reliability and accuracy are ensured.

In addition, in the actual use process, in order to further determine that the connector 10 is plugged in place, the automatic plugging/unplugging device 20 for a connector of the embodiments of the present disclosure may be used for reverse unplugging verification. For example, in the actual process, on the premise of judging that the connector 10 is plugged in place according to the above plugging-in-place judgment method, the external driving device drives the automatic plugging/unplugging device 20 for a connector to move away from an adapter or a socket. At this time, the magnitude of the unplugging force is detected by the force sensor 2023, and the external driving device is controlled so that the detected value of the force sensor 2023 is always less than an unplugging threshold K3 (the unplugging threshold K3 refers to the minimum unplugging force value required to unplug the connector normally when the connector and the adapter are in a normal locking state according to the general connector standards such as DIN, IEC and GB or the regulations of the connector data handbook). If it is detected that the connector 10 is unplugged based on sound and vibration or according to the displacement of the external driving device in the detection process, it is proved that the connector 10 is not locked normally, otherwise, it is proved that the connector 10 is locked normally.

By means of the automatic plugging/unplugging device 20 for a connector of the embodiments of the present disclosure, due to the provided force sensor 2033 configured to detect the plugging force or the unplugging force, the sound sensor 2014 configured to detect the sound generated during plugging or unplugging the connector 10, and the vibration sensor 2017 configured to detect the intensity of vibration of the connector 10 resulting from plugging or unplugging the connector 10, the plugging force or unplugging force during plugging or unplugging the connector 10 is monitored in real time, and based on various detection judgment methods of the sound sensor 2014 and the vibration sensor 2017, the automatic plugging or unplugging process is accurately controlled, and high-precision and high-reliability docking between the connector 10 and the corresponding socket or adapter is realized.

Figure 3:
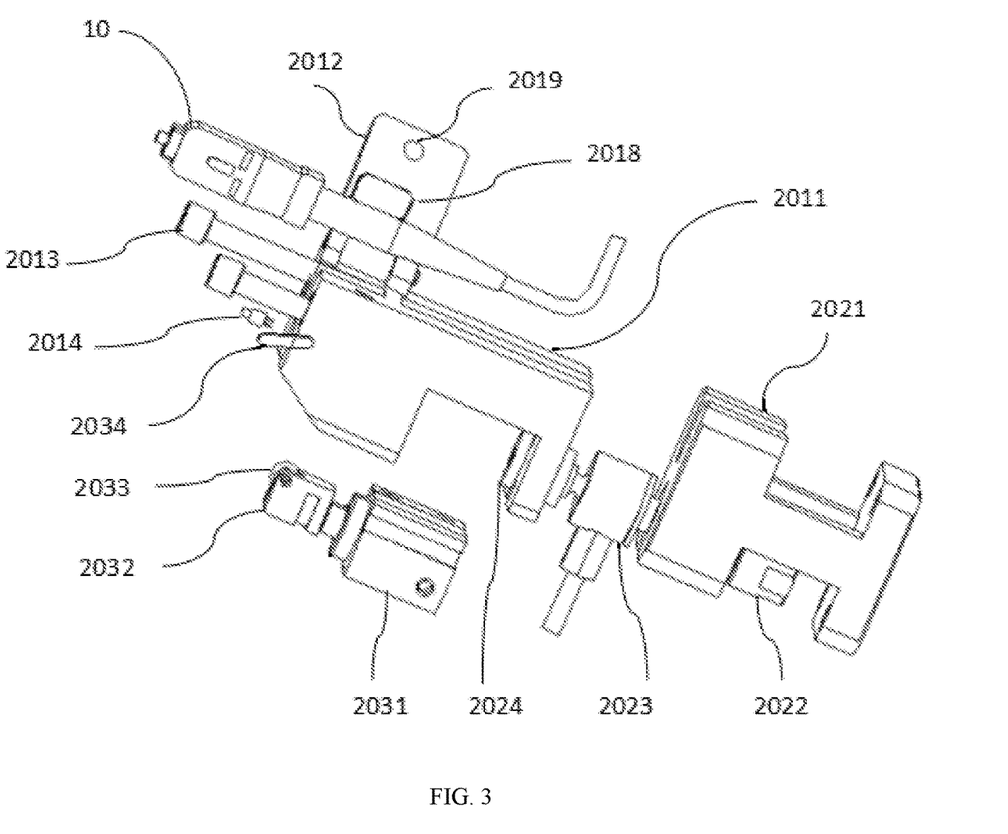
FIG. 3 is a local schematic structural diagram of a fit structure between an automatic plugging/unplugging device for a connector of an embodiment of the present disclosure and the connector.
Figure 4:
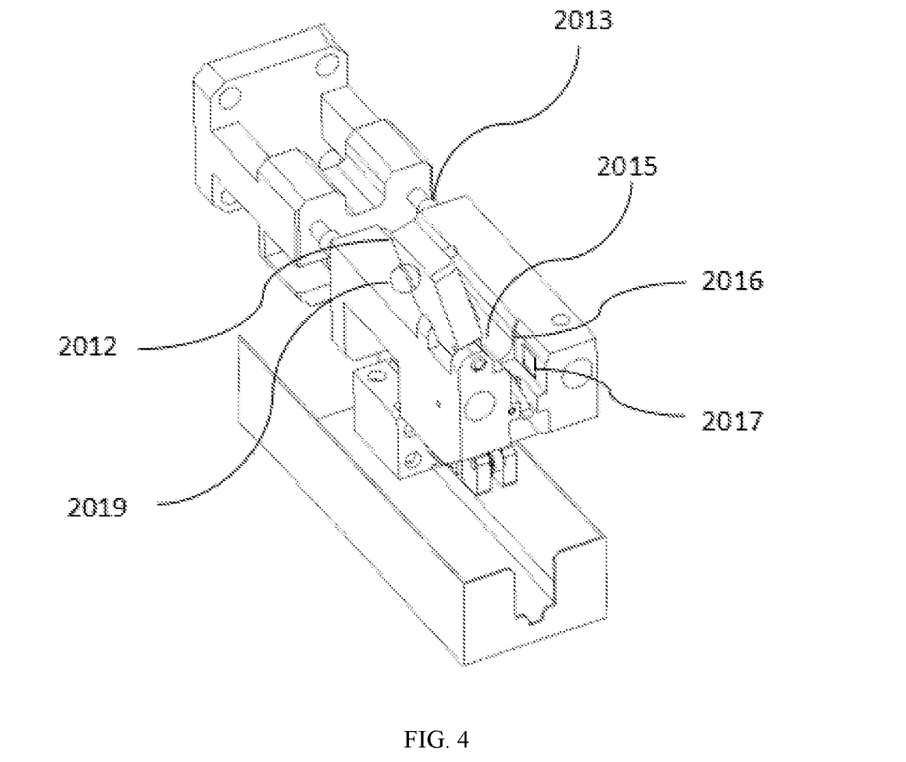
FIG. 4 is a local schematic structural diagram of an automatic plugging/unplugging device for a connector of an embodiment of the present disclosure.

In some embodiments, as shown in FIGS. 3-4, the clamping unit 201 includes a clamping base 2011 and a clamping cover plate 2012. The clamping base 2011 is provided with a fit groove 2015, the connector 10 may be fitted in the fit groove 2015, the vibration sensor 2017 is attached to an inner sidewall of the fit groove 2015, the clamping cover plate 2012 is buckled at an open end of the fit groove 2015, both ends of the clamping cover plate 2012 are respectively located at both sides of the fit groove 2015. One end of the clamping cover plate 2012 is rotatably connected to the clamping base 2011, and the other end of the clamping cover plate is connected to the clamping base 2011 by a clamping locking component 2019. It is to be understood that in the actual operation process, the connector 10 may be clamped and fixed on the clamping base 2011 by screwing the clamping locking component 2019, thus preventing plugging or unplugging errors caused by the shaking of the connector 10 during automatic plugging or unplugging. When the clamping locking component 2019 is manually unscrewed and the cover plate is unbuckled, the connector 10 may be quickly replaced.

Advantageously, as shown in FIG. 3, the clamping cover plate 2012 is provided with a flexible rubber pad 2018 at the side facing the fit groove 2015. When the clamping cover plate 2012 is buckled on the clamping base 2011 and is locked by the clamping locking component 2019, the flexible rubber pad 2018 presses the housing of the connector 10, which can increase the friction force, prevent the connector 10 from loosening in position, and prevent the hard pressing on the housing of the connector 10 during clamping, thus well preventing the phenomenon that the connector 10 is damaged.

In some embodiments, as shown in FIG. 4, the inner sidewall of the fit groove 2015 is further provided with a limiting step 2016 configured to stop the connector 10. Therefore, the limiting step 2016 directly contacts and clamps the end of the connector 10 to realize limiting and clamping functions, thus avoiding plugging or unplugging errors caused by the shaking of the connector 10 during automatic plugging or unplugging.

In some embodiments, as shown in FIG. 4, the clamping unit 201 further includes a guide rod 2013. One end of the guide rod 2013 is connected to the detection base 2021, and the other end of the guide rod is slidably connected to the clamping base 2011. It is to be understood that no matter during plugging or unplugging the connector 10, the clamping unit 201 may slide relative to the clamping base 2011, and if the sliding direction of the clamping unit 201 is deviated, the detected value of the force sensor 2023 may be incorrect, thus affecting the plugging or unplugging accuracy of the connector 10. In this embodiment, the clamping unit 201 further includes a guide rod 2013 configured to guide the clamping unit 201. In this way, the sliding direction of the clamping unit 201 may be prevented from being deviated, thus ensuring the detection accuracy of the force sensor 2023.

Figure 2:
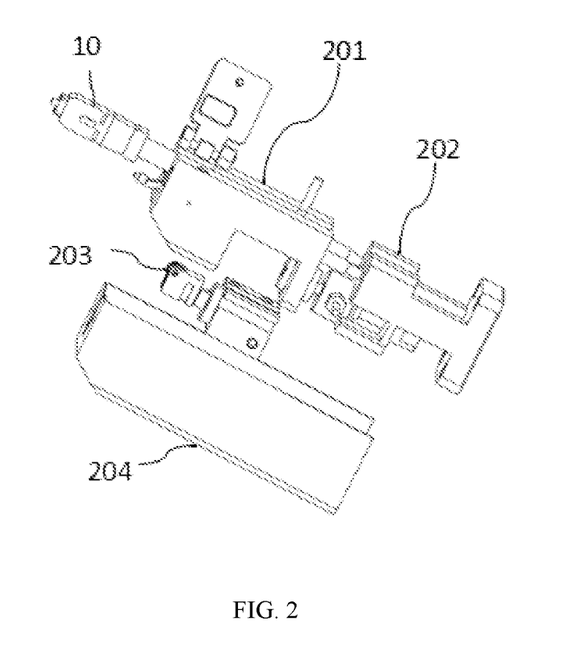
FIG. 2 is another schematic diagram of a fit structure between an automatic plugging/unplugging device for a connector of an embodiment of the present disclosure and the connector.

In some embodiments, as shown in FIGS. 2-3, the plugging/unplugging device for a connector 10 further includes an automatic unlocking unit 203. The clamping unit 201 is provided with a mounting groove, the automatic unlocking unit 203 is arranged in the mounting groove, one end of the automatic unlocking unit 203 extends out of the mounting groove, and the automatic unlocking unit 203 is configured to unlock a latch on the connector 10. It is to be understood that in the actual use process, a latch is present on the connector 10, and when the latch is in a normal locking state, the connector 10 is not detachable from the socket or adapter. In this embodiment, the plugging/unplugging device for a connector 10 further includes an automatic unlocking unit 203 configured to unlock the latch on the connector 10. In this way, during unplugging of the connector 10, the automatic unlocking unit 203 can automatically unlock the latch on the connector 10, so that the unplugging process of the connector 10 may be fully automated.

In some embodiments, as shown in FIG. 3, the automatic unlocking unit 203 includes an actuator 2031, a slider 2032, a pulley 2033 and an unlocking spring leaf 2034. The actuator 2031 is connected to the clamping unit 201 and located in a mounting groove. The slider 2032 is connected to the actuator 2031 and driven to slide along the mounting groove by the actuator 2031. The pulley 2033 is rotatably connected to the slider 2032, and the unlocking spring leaf 2034 is arranged on the inner sidewall of the mounting groove. When the actuator 2031 drives the slider 2032 to slide, the slider 2032 may press the unlocking spring leaf 2034 to contact the latch on the connector 10. It is to be understood that in the actual use process, when the actuator 2031 drives the slider 2032 to slide, the slider 2032 may press the unlocking spring leaf 2034 to contact the latch on the connector 10, thus well realizing the function of automatically unlocking the connector 10.

Figure 1:
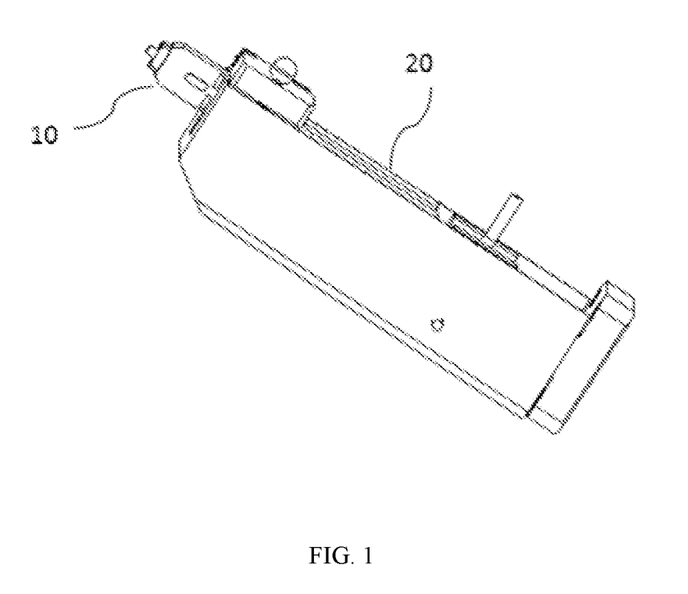
FIG. 1 is a schematic diagram of a fit structure between an automatic plugging/unplugging device for a connector of an embodiment of the present disclosure and the connector.

In some embodiments, as shown in FIG. 1, the automatic plugging/unplugging device 20 for a connector further includes a housing 204, which covers the clamping unit 201 and the force detection unit 202. Therefore, the housing 204 may protect the clamping unit 201 and the force detection unit 202, thereby prolonging the service life of the automatic plugging/unplugging device 20 for a connector.

Figure 5:
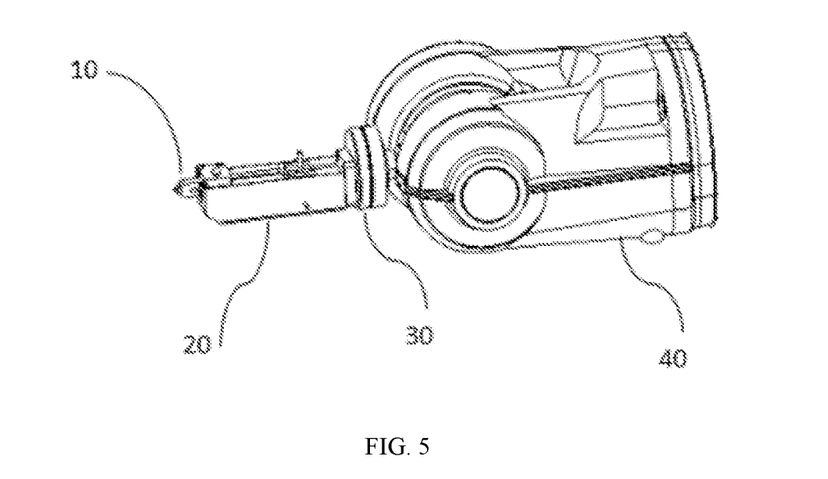
FIG. 5 is a schematic diagram of an automatic plugging/unplugging device for a connector of an embodiment of the present disclosure in one using state.

In some embodiments, as shown in FIG. 5, the automatic plugging/unplugging device 20 for a connector is connected to an end of an industrial mechanical arm 40 by an adapter plate 30. The automatic plugging/unplugging device 20 includes a clamping unit 201, a force detection unit 202 and a housing 204. The connector 10 plugged or unplugged by the automatic plugging/unplugging device 20 of this embodiment is an SC optical fiber connector, and the optical fiber connector adopts a push-pull latch mode with no need to unlock the latch before unplugging. The specific structure of the automatic plugging/unplugging device 20 for a connector is described above, which will not be repeated here. Only the plugging or unplugging process of the automatic plugging/unplugging device 20 of this embodiment will be described here. The specific process is as follows:

1. Plugging Process:

First, approaching stage: the industrial mechanical arm 40 controls the automatic plugging/unplugging device 20 mounted at the end of the industrial mechanical arm to gradually approach and align with a to-be-docked socket or adapter. In this process, the connector 10 is not in direct contact with the adapter, and none of the force sensor 2023, and the vibration sensor 2017 and the sound sensor 2014 has a detected value.

Second, plugging stage: the connector 10 is partially plugged into the adapter or socket, the magnitude of the plugging force is detected by the force sensor 2023, and the parameters of the mechanical arm are controlled during plugging to enable the plugging force not to exceed a limit value K1, thus ensuring that the connector 10 and the corresponding adapter are not damaged. For the single-headed SC optical fiber connector used in this embodiment, K1 may be set to 11.8N referring to the SC optical fiber connector standard.

Third, Plugging-In-Place Judgment Stage:

Three plugging-in-place judgment methods are provided as follows. In the practical application, one or more detection methods may be used to realize plugging-in-place judgment. For the single-headed SC connector 10, the snap needs to be actuated twice during plugging of the connector 10.

Detection method based on plugging force: in the plugging process, the industrial mechanical arm 40 controls its own moving speed, and the real-time plugging force is returned by the plugging/unplugging force sensor 2023. When the plugging force gradually increases, approaches and reaches a limit value K2, it is judged that the connector 10 is plugged in place. For the single-headed SC optical fiber connector used in this embodiment, K2 may be set to 11.8N referring to the SC optical fiber connector standard.

Detection method based on sound: in the plugging process, the sound of action of the circlip in the socket when docking is successful is detected by the sound sensor 2014, and if it is detected that the sound intensity exceeds a first preset intensity 51 twice, it is judged that docking is successful.

Detection method based on vibration: when the connector is plugged in place, the vibration of the connector 10 caused by the action of the circlip in the socket when docking is successful is detected by the vibration sensor 2017, and if it is detected that the vibration magnitude exceeds a first preset magnitude Z1 twice, it is judged that docking is successful.

Fourth, Reverse Unplugging Stage:

The industrial mechanical arm 40 is controlled to move away from the socket or adapter, and the unplugging force is controlled to gradually increase and not to exceed K3. For the single-headed SC optical fiber connector used in this embodiment, K3 may be set to 19.6N referring to the SC fiber connector standard.

Various methods to judge whether the connector 10 is locked during reverse unplugging of the connector 10 are provided. In the practical application, one or more detection methods may be used in cooperation to judge whether the connector 10 is locked, specifically:

Detection method based on plugging force: in the reverse unplugging process, if it is detected that the unplugging force drops to 0N, it is judged that the connector 10 is unplugged reversely on the premise that the unplugging force does not exceed K3, which means that the connector 10 is not locked.

Detection method based on sound: in the reverse unplugging process, the sound of releasing of the spring leaf in the socket structure during unplugging is detected by the sound sensor 2014, if it is detected that the sound intensity exceeds a second preset intensity S2 at least once, it is judged that the connector 10 is unplugged reversely on the premise that the unplugging force does not exceed K3, which means that the connector 10 is not locked.

Detection method based on vibration: in the reverse unplugging process, the vibration of the connector 10 caused by releasing of the circlip in the socket structure during unplugging is detected by the vibration sensor 2017, and if it is detected that the vibration magnitude exceeds a second preset magnitude Z2 at least once, it is judged that the connector 10 is unplugged reversely on the premise that the unplugging force does not exceed K3, which means that the connector 10 is not locked.

2. Unplugging Process:

The standard SC optical fiber connector used in this embodiment adopts a push-pull latch mode with no need to unlock the latch before unplugging.

Unplugging action: the industrial mechanical arm 40 is controlled to move away from a socket or an adapter, and the unplugging force is controlled to gradually increase and exceed K3. For the single-headed SC optical fiber connector used in this embodiment, K3 may be set to 19.6N referring to the SC fiber connector standard.

Various methods to judge whether the connector 10 is locked during reverse unplugging of the connector 10 are provided. In the practical application, one or more detection methods may be used in cooperation to judge whether the connector 10 is unplugged, specifically:

Detection method based on unplugging force: in the unplugging process, if it is detected that the unplugging force drops to 0N, it is judged that the connector 10 is unplugged.

Detection method based on sound: in the unplugging process, the sound of releasing of the spring leaf in the socket structure during unplugging is detected by the sound sensor 2014, and if it is detected that the sound intensity exceeds a third preset intensity S3 twice, it is judged that the connector 10 is unplugged.

Detection method based on vibration: in the unplugging process, the vibration of the connector 10 caused by the releasing of the circlip in the socket structure during unplugging is detected by the vibration sensor 2017, and if it is detected that the vibration magnitude exceeds a third preset magnitude Z3 twice, it is judged that the connector 10 is unplugged.

The connector 10 of this embodiment can also be other connectors 10 that do not need to be unlocked when being unplugged, for example, Type-C connector, 3.5 mm audio connector, etc., which have the same plugging process and unplugging process, but have different values of K1, K2 and K3. In this case, referring to corresponding connector standards, K1 is set to be 20N, K2 is set to be 15N, and K3 is set to be 8N.

Figure 6:
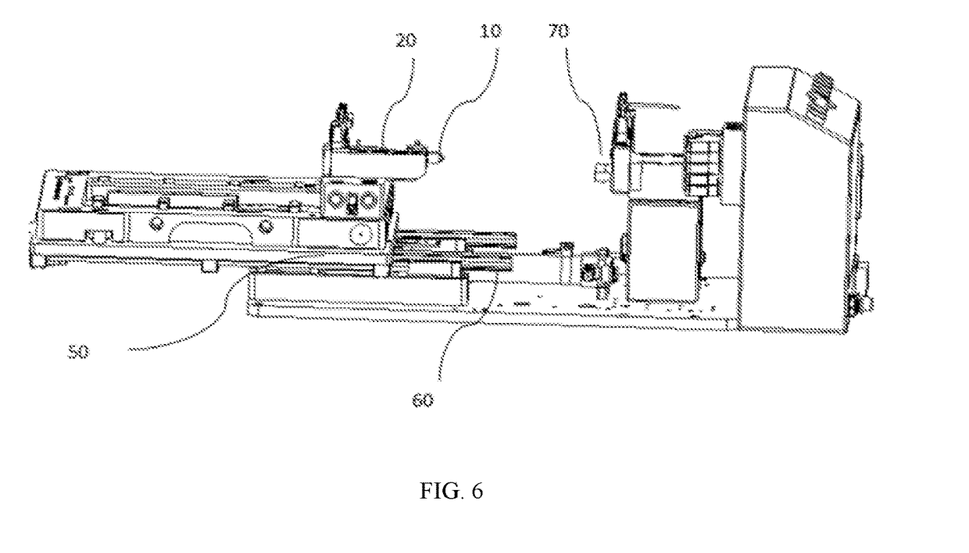
FIG. 6 is a schematic diagram of the automatic plugging/unplugging device for a connector of an embodiment of the present disclosure in another using state.

As shown in FIG. 6, in some embodiments, the automatic plugging/unplugging device 20 for a connector is mounted on the tray 50, and the tray 50 may move on the a electric sliding table 60, so that the automatic plugging or unplugging operation between an automatic plugging/unplugging unit and the a to-be-docked component 70 can be realized by the movement of the electric sliding table 60. The automatic plugging/unplugging device 20 includes a clamping unit 201, a force detection unit 202 and an automatic unlocking unit 203. The connector 10 plugged and unplugged by the automatic plugging/unplugging device 20 of this embodiment is a connector 10 adopting an RJ latch mode, such as RJ45 connector, LC optical fiber connector, MT-RJ optical fiber connector, RJ11 optical fiber connector or the like, which needs to be unlocked before unplugging. The specific structure of the automatic plugging/unplugging device 20 for the connector is described above, which will not be repeated here. Only the plugging or unplugging process of the automatic plugging/unplugging device 20 of this embodiment will be described here. The specific process is as follows:

1. Plugging Process:

First, approaching stage: the electric sliding table 60 moves to control the automatic plugging/unplugging unit mounted on the sliding table to gradually approach and align with a to-be-docked component 70. In this process, the connector 10 is not in direct contact with the to-be-docked component 70, and none of the force sensor 2023, the vibration sensor 2017 and the sound sensor 2014 has a detected value.

Second, plugging stage: the connector 10 is partially plugged into the adapter or socket, the magnitude of the plugging force is detected by the force sensor 2023, and parameters of the mechanical arm are controlled during plugging to enable the plugging force not to exceed a limit value K1, thus ensuring that the connector 10 and the corresponding adapter are not damaged. For the RJ45 connector used in this embodiment, K1 may be set to 20N referring to the RJ45 connector standard.

Third, Plugging-In-Place Judgment Stage:

Three plugging-in-place judgment methods are provided as follows. In the practical application, one or more detection methods may be used in cooperation to realize plugging-in-place judgment. For the RJ45 connector, the snap only needs to be actuated once during plugging of the RJ45 connector.

Detection method based on plugging force: in the plugging process, the electric sliding table 60 controls its own moving speed, and the real-time plugging force returned by the plugging/unplugging force sensor 2023. When the plugging force gradually increases, approaches and reaches a limit value K2, it is judged that the connector 10 is plugged in place. For the RJ45 connector used in this embodiment, K2 may be set to 20N referring to the RJ45 connector standard.

Detection method based on sound: in the plugging process, the sound of action of the circlip in the socket structure when docking is successful is detected by the sound sensor 2014, and if it is detected that the sound intensity exceeds a first preset intensity 51, it is judged that docking is successful.

Detection method based on vibration: when the connector is plugged in place, the vibration of the connector 10 caused by the action of the circlip in the socket structure when docking is successful is detected by the vibration sensor 2017, and if it is detected that the vibration magnitude exceeds a first preset magnitude Z1 once, it is judged that docking is successful.

Fourth, Reverse Unplugging Stage:

In the state where the latch is not unlocked, the electric sliding table 60 is controlled to move away from the to-be-docked component 70, and the unplugging force is controlled to gradually increase and not to exceed K3. For the RJ45 connector used in this embodiment, K3 may be set to 20N referring to the RJ45 connector standard.

Various methods to judge whether the connector 10 is locked during reverse unplugging of the connector 10 are provided. In the practical application, one or more detection methods may be used to judge whether the connector 10 is locked.

Detection method based on unplugging force: in the reverse unplugging process, if it is detected that the unplugging force drops to ON, it is judged that the connector 10 is unplugged reversely on the premise that the unplugging force does not exceed K3, which means that the connector 10 is not locked.

Detection method based on sound: in the reverse unplugging process, the sound of releasing of the spring leaf in the socket structure during unplugging is detected by the sound sensor 2014, and if it is detected that the vibration intensity exceeds a second preset intensity S2 once, it is judged that the connector 10 is unplugged reversely on the premise that the unplugging force does not exceed K3, which means that the connector 10 is not locked.

Detection method based on vibration: in the reverse unplugging process, the vibration of the connector 10 caused by releasing of the circlip in the socket structure during unplugging is detected by the vibration sensor 2017, and if it is detected that the vibration magnitude exceeds a second preset magnitude Z2 once, it is judged that the connector 10 is unplugged reversely on the premise that the unplugging force does not exceed K3, which means that the connector 10 is not locked.

2. Unplugging Process:

The RJ45 connector used in this example adopts an RJ latch mode with a need to unlock the latch before unplugging.

Unplugging action: the automatic unlocking unit 203 is controlled to start, and the slider 2032 is driven to slide by the actuator 2031, so that the slider 2032 presses the unlocking spring leaf 2034 to contact the latch on the connector 10; the electric sliding table 60 is controlled to move away from the to-be-docked component 70, and the unplugging force is controlled to gradually increase and exceed K3. For the RJ45 connector used in this embodiment, K3 may be set to 20N referring to the RJ45 connector standard.

Various methods to judge whether the connector 10 is locked during reverse unplugging of the connector 10 are provided. In the practical application, one or more detection methods may be used to judge whether the connector 10 is unplugged.

Detection method based on unplugging force: in the unplugging process, if it is detected that the unplugging force drops to ON, it is judged that the connector 10 is unplugged.

Detection method based on sound: in the unplugging process, the sound of releasing of the spring leaf in the socket structure during unplugging is detected by the sound sensor 2014, and if it is detected that the sound intensity exceeds a third preset intensity S3 once, it is judged that the connector 10 is unplugged.

Detection method based on vibration: in the unplugging process, the vibration of the connector 10 caused by releasing of the circlip in the socket structure during unplugging is detected by the vibration sensor 2017, and if it is detected that the vibration magnitude exceeds a third preset magnitude Z3 once, it is judged that the connector 10 is unplugged.

The automatic plugging/unplugging device for a connector of the embodiments of the present disclosure can realize the clamping of the connector and ensure the connection accuracy of the connector in the plugging or unplugging process, avoiding the phenomenon of a poor signal caused by a weak connection of the connector and the phenomenon of damage to the connector or adapter caused by excessive fit of the connector.

According to embodiments in a second aspect of the present disclosure, provided is an automatic plugging method for a connector. The specific steps of the automatic plugging method for the automatic plugging/unplugging device for a connector will be described below with reference to FIG. 7.

Figure 7:
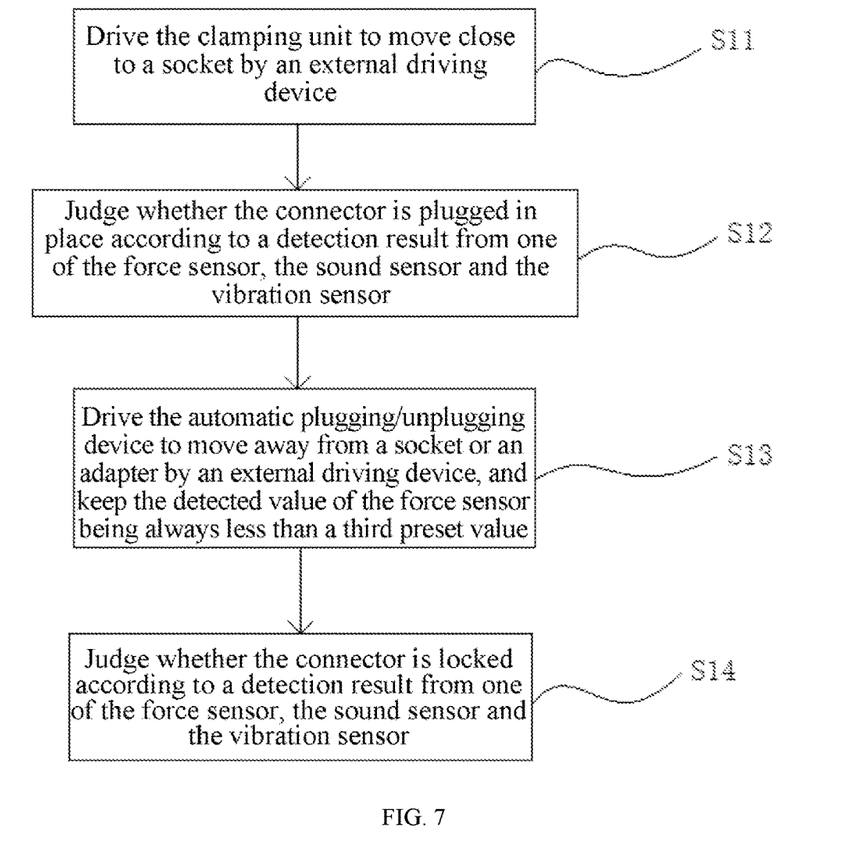
FIG. 7 is a flowchart of an automatic plugging method for the automatic plugging/unplugging device for a connector of an embodiment of the present disclosure.

As shown in FIG. 7, in the embodiments of the present disclosure, an automatic plugging method for the automatic plugging/unplugging device for a connector, including steps S11 to S12.

At S11, the clamping unit 201 is driven to move close to a socket by an external driving device.

At S12, whether the connector 10 is plugged in place is judged according to a detection result from one of the force sensor 2023, the sound sensor 2014 and the vibration sensor 2017.

According to the automatic plugging method for the automatic plugging/unplugging device for a connector of the embodiments of the present disclosure, various detection judgment methods based on the force sensor 2023, the sound sensor 2014 and the vibration sensor 2017 are adopted, accurate control of the automatic plugging process is realized, and high-precision and high-reliability docking between the connector 10 and the corresponding socket or adapter is realized.

For example, in the actual plugging monitoring process, if the detected value of the force sensor 2023 reaches a first preset value, it is judged that the connector 10 is plugged in place. Alternatively, if the number of times that the vibration magnitude detected by the vibration sensor 2017 is greater than a preset magnitude exceeds a first vibration number, it is judged that the connector 10 is plugged in place. Alternatively, if the number of times that the sound intensity detected by the sound sensor 2014 is greater than a first preset intensity exceeds a first sound number, it is judged that the connector 10 is plugged in place.

In some embodiments, when the automatic plugging/unplugging device 20 is driven to move close to a socket or an adapter by an external driving device, the detected value of the force sensor 2023 is kept less than a second preset value. Therefore, the magnitude of the plugging force from the connector 10 may be well controlled, thereby avoiding the phenomenon that the connector 10, the socket or the adapter is damaged during plugging.

In some embodiments, verifying whether the connector is locked normally by means of a reverse unplugging method after judging that the connector 10 is plugged in place includes steps of S13 and S14. At S13, the automatic plugging/unplugging device 20 is driven to move away from a socket or an adapter by an external driving device, and the detected value of the force sensor 2023 is kept always less than a third preset value. At S14, whether the connector 10 is locked normally is judged according to a detection result from one of the force sensor 2023, the sound sensor 2014 and the vibration sensor 2017. It is to be understood that in some scenarios, there is a need to ensure that the connector 10 is plugged accurately. At this time, it is judged that the connector 10 is plugged in place, and then a reverse unplugging test is performed to ensure that the connector 10 is locked normally. Therefore, double test results of the plugging-in-place test and the reverse unplugging test can ensure the stability of connection between the connector 10 and the socket or adapter, avoiding the phenomenon of a poor signal caused by a weak connection.

For example, when the automatic plugging/unplugging device 20 is driven to move away from a socket or an adapter by an external driving device, the detected value of the force sensor 2023 is kept less than a third preset value at this time, and if the detected value of the force sensor 2023 changes to zero, it is judged that the connector 10 is unplugged under the condition where the plugging force is less than the third preset value, that is, it is indicated that the connector is not locked normally. Alternatively, if the vibration magnitude detected by the vibration sensor 2017 is greater than a preset magnitude at least once, it is judged that the connector 10 is plugged under the condition where the plugging force is less than the third preset value, that is, it is indicated that the connector is not locked normally. Alternatively, if the sound intensity detected by the sound sensor 2014 is greater than a preset intensity at least once, it is judged that the connector 10 is unplugged under the condition where the plugging force is less than the third preset value, that is, it is indicated that the connector is not locked normally.

By means of the automatic plugging method of the embodiments of the present disclosure, the plugging accuracy of the connector may be ensured, and the phenomenon of a poor signal caused by a weak connection of the connector and the phenomenon that the connector or adapter is damaged due to excessive fit of the connector may be avoided.

According to embodiments in a third aspect of the present disclosure, provided is an automatic unplugging method for a connector. The specific steps of the automatic unplugging method for the automatic plugging/unplugging device for a connector will be described below with reference to FIG. 8.

Figure 8:
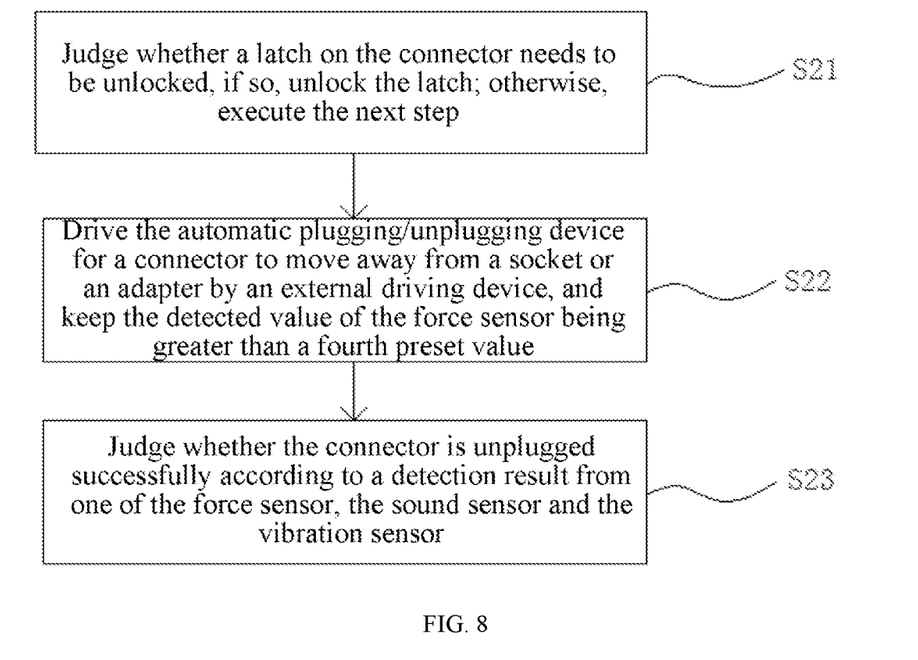
FIG. 8 is a flowchart of an automatic unplugging method for the automatic plugging/unplugging device for a connector of an embodiment of the present disclosure.

As shown in FIG. 8, in the embodiments of the present disclosure, an automatic unplugging method for the automatic plugging/unplugging device for a connector, including steps S21 to S23.

At S21, whether a latch on the connector 10 needs to be unlocked is judged, if so, the latch is unlocked; otherwise, the next step is executed.

At S22, the automatic plugging/unplugging device 20 for a connector is driven to move away from a socket or an adapter by an external driving device, and the detected value of the force sensor 2023 is kept greater than a fourth preset value.

It should be added here that in the process of actually unplugging the connector 10, the fourth preset value may be set to different values according to different types of connectors. For example, for a plugging/unplugging latch connector, when being unplugged, the connector can be unplugged normally only when the unplugging force is greater than the specified value in the connector standard or the unplugging force requirement in the connector data handbook. That is to say, the fourth preset value for such connector 10 is set according to the specified value in the connector standard or the connector data handbook. For another example, for an RJ latch connector (such as an RJ45 network interface socket), the latch is required to be unlocked when the connector 10 is unplugged, but the unplugging force is not explicitly required, thus the fourth preset value for such connector 10 may be set to a suitable unplugging value. For yet another example, for a direct plugging/unplugging connector (such as a USB interface), the latch is not required to be unlocked when the connector 10 is unplugged, and the plugging force is not explicitly required, thus the fourth preset value for such connector 10 may also be directly set to a suitable unplugging value.

At S23, whether the connector 10 is unplugged successfully is judged according to a detection result from one of the force sensor 2023, the sound sensor 2014 and the vibration sensor 2017.

According to the automatic unplugging method for the automatic plugging/unplugging device for a connector of the embodiments of the present disclosure, various detection judgment methods based on the force sensor 2023, the sound sensor 2014 and the vibration sensor 2017 are adopted, so that the automatic unplugging process is accurately controlled.

For example, when the automatic plugging/unplugging device 20 is driven to move away from a socket or an adapter by an external driving device, and the detected value of the force sensor 2023 changes to zero, it is judged that the connector 10 is unplugged successfully. It should be added here that the detected value of the force sensor 2023 may gradually increase in the actual unplugging process, but when the connector 10 is separated from the socket or adapter, the detected value of the force sensor 2023 may suddenly change to 0. Therefore, it is more accurate to judge whether the connector 10 is unplugged successfully at the time point when the detected value of the force sensor 2023 suddenly changes to zero.

Alternatively, if the number of times that the vibration magnitude detected by the vibration sensor 2017 is greater than a third preset magnitude exceeds a third vibration number, it is judged that the connector 10 is unplugged successfully.

Alternatively, if the number of times that the sound intensity detected by the sound sensor 2014 is greater than a third preset intensity exceeds a third sound number, it is judged that the connector 10 is unplugged successfully.

By means of the automatic unplugging method for a connector of the embodiments of the present disclosure, the connector may be quickly unplugged.

According to embodiments in a fourth aspect of the present disclosure, provided is a computer-readable storage medium on which a computer program is stored, where the computer program is configured to execute the automatic plugging method or automatic unplugging method for any one automatic plugging/unplugging device for a connector.

By means of the automatic plugging/unplugging device for a connector of the embodiment of the present disclosure, due to the provided force sensor configured to detect the plugging force or the unplugging force, the sound sensor configured to detect the sound generated during plugging or unplugging the connector, and the vibration sensor configured to detect the intensity of vibration of the connector resulting from plugging or unplugging the connector, the plugging force or unplugging force during plugging or unplugging of the connector is monitored in real time, and based on various detection judgment methods of the sound sensor and the vibration sensor, the automatic plugging or unplugging process is accurately controlled, and high-precision and high-reliability docking between the connector and corresponding socket or adapter is realized.

By means of the automatic plugging method for the automatic plugging/unplugging device for a connector of the embodiments of the present disclosure, various detection judgment methods based on the force sensor, the sound sensor and the vibration sensor are adopted, the automatic plugging process is accurately controlled, and high-precision and high-reliability docking between the connector and the corresponding socket or adapter is realized.

By means of the automatic unplugging method for the automatic plugging/unplugging device for a connector of the embodiments of the present disclosure, various detection judgment methods based on the force sensor, the sound sensor and the vibration sensor are adopted, and the automatic unplugging process is accurately controlled.

In the description of this specification, description with reference to the terms "some embodiments", "other embodiments", etc., means that particular features, structures, materials, or characteristics described in conjunction with those embodiments or examples is included in at least one embodiment or example of the present disclosure. In the description, the schematic expressions of the above terms do not necessarily refer to the same embodiments or examples. Furthermore, the specific features, structures, materials or characteristics described may be combined in any one or more embodiments or examples in a suitable manner.

The above contents are only some embodiments of the present disclosure. For those having ordinary skill in the art, according to the idea of the present disclosure, alterations may be made to the specific embodiments and the scope of the disclosure, and the contents of the description should not be interpreted as limiting the present disclosure.

The invention claimed is:

1. An automatic plugging/unplugging device for a connector, comprising:
   a clamping unit (201), configured to hold the connector (10) and comprising at least one of a vibration sensor (2017) and a sound sensor (2014), wherein the vibration sensor (2017) is configured to detect the vibration resulting from plugging or unplugging the connector (10), and the sound sensor (2014) is configured to detect the sound generated during plugging or unplugging the connector (10); and
   a force detection unit (202), comprising a detection base (2021) and a force sensor (2023), wherein the force sensor (2023) comprises a locking end (2022) and a movable end (2024), the locking end (2022) is connected to the detection base (2021), and the movable end (2024) is connected to the clamping unit (201), and the force sensor (2023) is configured to detect the magnitude of a plugging or unplugging force generated during plugging or unplugging the connector (10);
   wherein the clamping unit (201) comprises:
   a clamping base (2011), wherein the clamping base (2011) is provided with a fit groove (2015) in which the connector (10) is fitted in, and the vibration sensor (2017) is attached to an inner sidewall of the fit groove (2015); and
   a clamping cover plate (2012), wherein the clamping cover plate (2012) is buckled at an open end of the fit groove (2015), both ends of the clamping cover plate (2012) are respectively located at both sides of the fit groove (2015), and one end of the clamping cover plate (2012) is rotatably connected to the clamping base (2011), and the other end of the clamping cover plate is connected to the clamping base (2011) by a clamping locking component (2019).

2. The automatic plugging/unplugging device for a connector of claim 1, wherein the inner sidewall of the fit groove (2015) is further provided with a limiting step (2016) configured to stop the connector (10).

3. The automatic plugging/unplugging device for a connector of claim 1, wherein the clamping unit (201) further comprises a guide rod (2013), wherein one end of the guide rod (2013) is connected to the detection base (2021), and the other end of the guide rod is slidably connected to the clamping base (2011).

4. The automatic plugging/unplugging device for a connector of claim 1, wherein the plugging/unplugging device for the connector (10) further comprises an automatic unlocking unit (203), wherein the clamping unit (201) is provided with a mounting groove, the automatic unlocking unit (203) is arranged in the mounting groove, one end of the automatic unlocking unit (203) extends out of the mounting groove, and the automatic unlocking unit (203) is configured to unlock a latch on the connector (10).

5. The automatic plugging/unplugging device for a connector of claim 4, wherein the automatic unlocking unit (203) comprises:
   an actuator (2031), wherein the actuator (2031) is connected to the clamping unit (201) and located in the mounting groove;
   a slider (2032), wherein the slider (2032) is connected to the actuator (2031), and the actuator (2031) is capable of driving the slider (2032) to slide along the mounting groove;
   a pulley (2033), wherein the pulley (2033) is rotatably connected to the slider (2032); and
   an unlocking spring leaf (2034), wherein the unlocking spring leaf (2034) is arranged on the inner sidewall of the mounting groove, and the slider (2032) is configured to press the unlocking spring leaf (2034) to contact the latch on the connector (10) in response to the actuator (2031) driving the slider (2032) to slide.

6. An automatic plugging method for the automatic plugging/unplugging device for a connector of claim 1, comprising following steps:
   driving the automatic plugging/unplugging device (20) for a connector to move close to a socket or an adapter by an external driving device; and
   judging whether the connector (10) is plugged in place according to a detection result from one of the force sensor (2023), the sound sensor (2014) and the vibration sensor (2017).

7. The automatic plugging method of claim 6, wherein in response to the detected value of the force sensor (2023) reaching a first preset value, it is judged that the connector (10) is plugged in place; or
   in response to the number of times that the vibration magnitude detected by the vibration sensor (2017) is greater than a first preset magnitude exceeding a first vibration number, it is judged that the connector (10) is plugged in place; or
   in response to the number of times that the sound intensity detected by the sound sensor (2014) is greater than a first preset intensity exceeding a first sound number, it is judged that the connector (10) is plugged in place.

8. The automatic plugging method of claim 6, wherein when the automatic plugging/unplugging device (20) for a connector is driven to move close to a socket or an adapter by an external driving device, the detected value of the force sensor (2023) is kept less than a second preset value.

9. The automatic plugging method of claim 6, wherein verifying whether the connector is locked normally by means of a reverse unplugging method after judging that the connector (10) is plugged in place comprises:
   driving the automatic plugging/unplugging device (20) for a connector to move away from a socket or an adapter by an external driving device, and keeping the detected value of the force sensor (2023) always less than a third preset value; and
   judging whether the connector (10) is locked normally according to a detection result from one of the force sensor (2023), the sound sensor (2014) and the vibration sensor (2017).

10. The automatic plugging method of claim 9, wherein when the automatic plugging/unplugging device (20) for a connector is driven to move away from a socket or an adapter by an external driving device, in response to the detected value of the force sensor (2023) changing to zero, it is judged that the connector (10) is not locked normally; or
   in response to the number of times that the vibration magnitude detected by the vibration sensor (2017) is greater than the preset magnitude exceeding a first preset number of times, it is judged that the connector (10) is not locked normally; or
   in response to the number of times that the sound intensity detected by the sound sensor (2014) is greater than the preset intensity exceeding a second preset number of times, it is judged that the connector (10) is not locked normally.

11. A non-transitory computer-readable storage medium storing a computer program which, when executed by a processor, causes the processor to carry out the automatic plugging method for the automatic plugging/unplugging device for a connector of claim 7.

12. An automatic unplugging method for the automatic plugging/unplugging device for a connector of claim 1, comprising following steps:
   judging whether a latch on the connector (10) needs to be unlocked, if yes, unlocking the latch; otherwise, executing the next step;
   driving the automatic plugging/unplugging device (20) for a connector to move away from a socket or an adapter by an external driving device, and keeping the detected value of the force sensor (2023) greater than a fourth preset value; and
   judging whether the connector (10) is unplugged successfully according to a detection result from one of the force sensor (2023), the sound sensor (2014) and the vibration sensor (2017).

13. The automatic unplugging method of claim 12, wherein when the automatic plugging/unplugging device (20) for a connector is driven to move away from the socket or adapter by the external driving device, in response to the detected value of the force sensor (2023) changing to zero, it is judged that the connector (10) is unplugged successfully; or
   in response to the number of times that the vibration magnitude detected by the vibration sensor (2017) is greater than a third preset magnitude exceeding a third vibration number, it is judged that the connector (10) is unplugged successfully; or
   in response to the number of times that the sound intensity detected by the sound sensor (2014) is greater than a third preset intensity exceeding a third sound number, it is judged that the connector (10) is unplugged successfully.

14. A non-transitory computer-readable storage medium storing a computer program which, when executed by a processor, causes the processor to carry out the automatic unplugging method for the automatic plugging/unplugging device for a connector of claim 12.

* * * * *